United States Patent
Lifson et al.

(10) Patent No.: US 6,873,504 B2
(45) Date of Patent: Mar. 29, 2005

(54) SYSTEM AND METHOD FOR DETECTING LOSS OF PHASE IN A COMPRESSOR SYSTEM

(75) Inventors: Alexander Lifson, Manlius, NY (US); Michael F. Taras, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 366 days.

(21) Appl. No.: 10/247,449

(22) Filed: Sep. 19, 2002

(65) Prior Publication Data

US 2004/0057170 A1 Mar. 25, 2004

(51) Int. Cl.[7] ................................................. H02H 7/00
(52) U.S. Cl. ........................ 361/22; 361/93.6; 324/772
(58) Field of Search .................... 361/22, 33, 93.6; 324/772

(56) References Cited

U.S. PATENT DOCUMENTS

| | | | | |
|---|---|---|---|---|
| 4,509,088 A | * | 4/1985 | Profio | 361/29 |
| 5,524,083 A | * | 6/1996 | Horne et al. | 700/293 |
| 5,777,835 A | * | 7/1998 | Innes | 361/93.6 |
| 6,252,365 B1 | * | 6/2001 | Morris et al. | 318/455 |

* cited by examiner

Primary Examiner—Stephen W. Jackson
Assistant Examiner—Boris Benenson
(74) Attorney, Agent, or Firm—Bachman & LaPointe, PC

(57) ABSTRACT

A system for detecting loss of an electrical phase in a compressor system includes a compressor system component having a plurality of phase carrying legs; a sensor for measuring current communicated with one leg of the plurality of phase carrying legs; and a processor unit adapted to receive a signal from the sensor and determine whether loss of phase has occurred in any of the plurality of phase carrying legs.

12 Claims, 1 Drawing Sheet

SYSTEM AND METHOD FOR DETECTING LOSS OF PHASE IN A COMPRESSOR SYSTEM

BACKGROUND OF THE INVENTION

The invention relates to compressor and vapor compression systems and, more particularly, to a system and method for diagnosing and detecting loss of phase in connection with same.

Vapor compression systems typically include compressor components such as compressors, fans and the like which operate using three phase electric motors.

During normal operation, current is provided to the component through each phase and the component operates as expected. One reliability issue is the loss of phase in one or more legs of the motor. Loss of phase in one of the three operating legs is a serious reliability and safety issue. Thus, detection of loss of phase is a significant concern.

Conventionally, in order to accurately diagnose loss of phase in any of the three legs, a current-detecting sensor is required on each leg. This advantageously diagnosis loss of phase in any of the three legs. However, it also leads to substantial cost since three sensors are required for proper detection.

It is the primary object of the present invention to provide for detection and diagnosis of loss of phase in any of the three legs, with a savings in equipment and cost.

Other objects and advantages of the present invention will appear hereinbelow.

SUMMARY OF THE INVENTION

In accordance with the present invention, the foregoing objects and advantages have been readily attained.

According to the invention, a system is provided for detecting loss of an electrical phase in a compressor system, which system comprises a compressor system component having a plurality of phase carrying legs; a sensor for measuring current communicated with one leg of said plurality of phase carrying legs; and a processor unit adapted to receive a signal from said sensor and determine whether loss of phase has occurred in any of said plurality of phase carrying legs.

In further accordance with the invention, a method is provided for detecting loss of an electrical phase in a compressor system, which method comprises the steps of providing a compressor system including at least one compressor system component having a plurality of phase carrying legs; measuring current in one leg of said plurality of legs; and detecting loss of phase in any of said plurality of legs from measurements obtained from said one leg.

BRIEF DESCRIPTION OF THE DRAWINGS

A detailed description of preferred embodiments of the present invention follows, with reference to the attached drawings, wherein.

DETAILED DESCRIPTION

The invention relates to a system and method for detecting loss of phase in a compressor system.

Compressor system components include various electrically powered components, many of which are operated using three phase electric motors. As set forth above, detection of loss of phase is a serious reliability and safety concern, and an improved system and method for detecting loss of phase is provided in accordance with the present invention.

In accordance with the present invention, it has been found that the quantity of current in any leg providing phase to a component is affected by loss of phase in that same leg, and also by loss of phase in any other leg providing phase to that component. Based upon this discovery, diagnosis of loss of phase is advantageously provided utilizing a single current transducer installed on any one of three legs providing phase to the component, which transducer is communicated with a processor unit for diagnosing loss of phase based upon signals received from the transducer.

Figure 1:
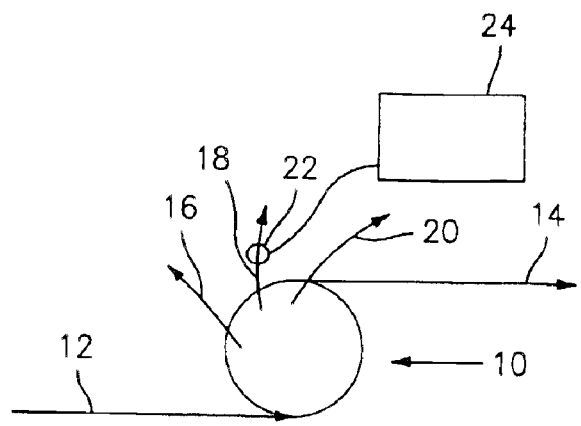
FIG. 1 schematically illustrates a portion of a compression system including a sensor for diagnosing loss of phase in accordance with the present invention.

FIG. 1 shows a portion of a typical compressor system including a compressor component 10 typically having suction and discharge lines 12, 14 respectively by a three phase electric motor, which is powered through three legs 16, 18, 20 as is well known to a person of ordinary skill in the art. Phase is provided to component 10 through legs 16, 18, 20 for operation of component 10 in a well known manner.

In accordance with the present invention, a current transducer 22 is installed on a single leg, in this case leg 18, and is also communicated with a processor unit 24. Transducer 22 is adapted to perform a measurement that corresponds to a quantity of current in leg 18, and to send a signal to processor unit 24 corresponding to this quantity of signal.

In accordance with the present invention, and advantageously, processor unit 24 is adapted to receive this signal from sensor or transducer 22 and determine whether loss of phase has occurred in any of legs 16, 18, 20.

Conventionally, sensors are required for each leg 16, 18, 20, and this leads to increased cost. In accordance with the present invention, however, it has been found that current on an operating leg increases when phase is lost in one of the other legs. In connection with a typical three phase air conditioning system, it has been found that upon loss of phase in one leg, current in the other two legs increases by approximately 70%. Thus, processor unit 24 in accordance with the present invention can advantageously be programmed with data corresponding to the appropriate compressor system with which it is to be communicated so that increase in current in the leg being measured can be used to diagnose loss of phase in one of the other legs. In connection with the specific example set forth above, that is, a three phase system, processor unit 24 can advantageously be adapted to diagnose a loss of phase upon sudden increase in current in leg 18 of, for example, 50% or more if the phase is lost on leg 16 or 20. Of course, should phase be lost in leg 18 itself, transducer or sensor 22 will identify this, as well, since current quickly drops to zero in that leg.

It should be appreciated that the system and method in accordance with the present invention can advantageously be used to detect loss of phase during startup or during continuous running. Several scenarios are possible thereby, and the system and method in accordance with the present invention reacts to each as follows.

During startup, if phase is missing in leg 18 where current is actually measured, the sensor shows a zero current, and the absence of current is a clear indication that phase is missing.

During compressor startup when a phase is missing from either leg 16 or leg 20, the current would reach a very high value in leg 18, corresponding to a locked rotor current, and then quickly drop to zero as the compressor trips on a line break. The high current initially detected indicates that the problem is potentially caused by a missing phase.

In the case of ongoing operation of the compressor, when one phase is dropped, if this phase is lost from leg 18 having a sensor, the reading on the sensor changes from a certain expected value to zero, which is a clear indication that the phase has dropped.

Finally, in the instance where the compressor is running and the phase is dropped from either leg 16 or leg 20, which has no sensor, the reading on the leg that does have the sensor will change abruptly from a certain expected value to a value which is roughly 70% higher than the expected value, and which is well above measurement and manufacturing tolerance range. This, too, is a clear indication that phase is missing.

Figure 2:
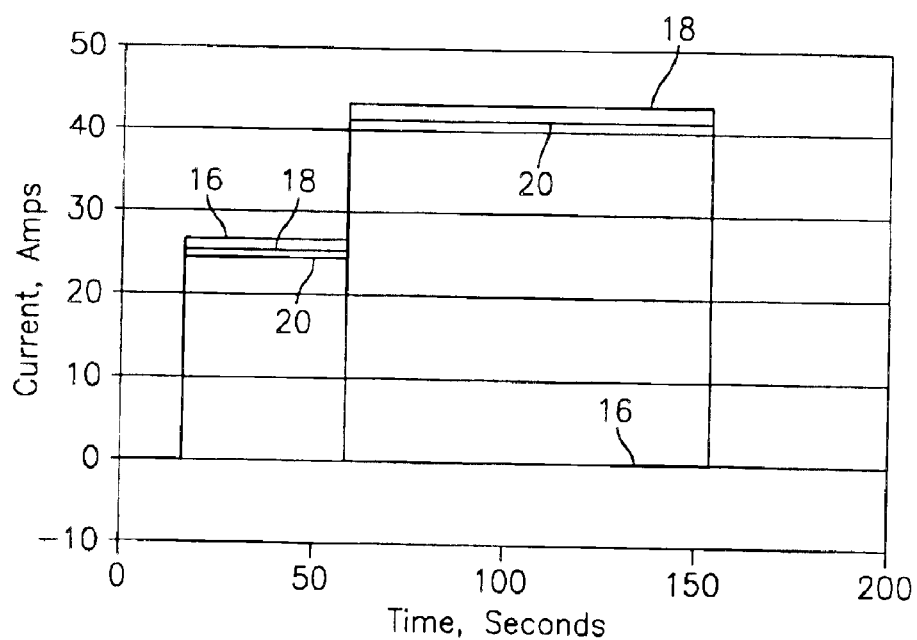
FIG. 2 illustrates current values in each of three phases before and after a loss of phase in one of the legs.

FIG. 2 shows current measured on each of three phases during normal operation and during loss of phase.

FIG. 2 shows current in legs 16, 18, 20 during normal operation for the initial time period, and shows substantially the same current in each leg. Upon loss of phase in one leg 16, a sudden increase in current in legs 18, 20 occurred with no current in leg 16. Thus, a sensor on any leg can provide an indication for diagnosing loss of phase as desired in accordance with the invention.

It should be appreciated that although the present invention is given in terms of detection of loss of phase to a compressor having three legs, detection of loss of phase in accordance with the present invention can readily be adapted to other components in a compression system as well, and further can be incorporated into systems where electric motors with more than three phases are applied.

Transducer 22 in accordance with the present invention can be any widely available and well known transducer so long as it is capable of determining the quantity of current measured either directly or after appropriate processing.

Processor unit 24 can be any readily available computing or processing device.

It should further be appreciated that the system and method in accordance with the present invention can be adapted to existing systems and likewise can be incorporated into new systems, without limitation.

It should also be readily appreciated that the system and method in accordance with the present invention advantageously provides for diagnosis of loss of phase in any of the multiple legs providing phase to a component, on the basis of a single transducer, which represents a significant savings in equipment cost as compared to conventional systems and methods.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A system for detecting loss of an electrical phase in a compressor system, comprising:
    a compressor system component having a plurality of phase carrying legs;
    a sensor for measuring current communicated with one leg of said plurality of phase carrying legs; and
    a processor unit adapted to receive a signal from said sensor and determine whether loss of phase has occurred in any of said plurality of phase carrying legs.

2. The system of claim 1, wherein said compressor system component is a compressor.

3. The system of claim 1, wherein said compressor system component is a fan.

4. The system of claim 1, wherein said compressor system component has three phase carrying legs and wherein a single sensor is communicated with one of said three legs.

5. The system of claim 1, wherein said processor unit is adapted to detect loss of phase in a leg of said plurality of legs that is not communicated with said sensor based upon magnitude of current in said one leg which is communicated with said sensor.

6. The system of claim 1, wherein said processor unit is adapted to detect loss of phase at startup of said compressor system component and during operation of said compressor system component.

7. A method for detecting loss of an electrical phase in a compressor system, comprising the steps of:
    providing a compressor system including at least one compressor system component having a plurality of phase carrying legs;
    measuring current in one leg of said plurality of legs; and
    detecting loss of phase in any of said plurality of legs from measurements obtained from said one leg.

8. The method of claim 7, wherein said compressor system component is a compressor.

9. The method of claim 7, wherein said compressor system component is a fan.

10. The method of claim 7, wherein said compressor system component has three phase carrying legs and wherein a single sensor is communicated with one of said three legs.

11. The method of claim 7, wherein said processor unit is adapted to detect loss of phase in a leg of said plurality of legs that is not communicated with said sensor based upon magnitude of current in said one leg which is communicated with said sensor.

12. The system of claim 7, wherein said processor unit is adapted to detect loss of phase at startup of said compressor system component and during operation of said compressor system component.

* * * * *